(12) United States Patent
Birkelbach et al.

(10) Patent No.: US 7,021,877 B2
(45) Date of Patent: Apr. 4, 2006

(54) SELF-TAPPING SCREW

(75) Inventors: Ralf Birkelbach, Marburg (DE); Dirk Runkel, Bad Laasphe (DE); Gerd Weigel, Eschenburg (DE)

(73) Assignee: EJOT GmbH & Co. KG, (DE)

( * ) Notice: Subject to any disclaimer, the term of this patent is extended or adjusted under 35 U.S.C. 154(b) by 4 days.

(21) Appl. No.: 10/633,592

(22) Filed: Aug. 5, 2003

(65) Prior Publication Data

US 2004/0081535 A1 Apr. 29, 2004

(30) Foreign Application Priority Data

Aug. 5, 2002 (DE) ................................ 102 35 817

(51) Int. Cl.
F16B 35/04 (2006.01)

(52) U.S. Cl. ...................................... 411/412
(58) Field of Classification Search ........ 411/411–417, 411/386
See application file for complete search history.

(56) References Cited

U.S. PATENT DOCUMENTS

| 635,297 | A | * | 10/1899 | Caldwell | 411/411 |
|---|---|---|---|---|---|
| 3,129,963 | A | * | 4/1964 | Robbins | 285/334 |
| 3,133,578 | A | * | 5/1964 | Moskovitz | 411/309 |
| 3,504,722 | A | * | 4/1970 | Breed | 411/168 |
| 3,537,288 | A | * | 11/1970 | Ansingh | 72/88 |
| 3,794,092 | A | * | 2/1974 | Carlson et al. | 411/310 |
| 3,878,759 | A | * | 4/1975 | Carlson | 411/416 |
| 4,179,976 | A | * | 12/1979 | Sygnator | 411/413 |
| 4,258,607 | A | * | 3/1981 | McKewan | 411/417 |
| 4,351,626 | A | * | 9/1982 | Holmes | 411/311 |
| 5,304,024 | A | * | 4/1994 | Schuster | 411/418 |
| 5,570,983 | A | | 11/1996 | Hollander | |
| 6,158,939 | A | * | 12/2000 | Grossberndt et al. | 411/411 |
| 6,185,896 | B1 | * | 2/2001 | Roberts et al. | 52/537 |
| 6,338,600 | B1 | * | 1/2002 | Friederich et al. | 411/424 |
| 6,722,833 | B1 | * | 4/2004 | Birkelbach | 411/411 |
| 2002/0094255 | A1 | * | 7/2002 | Neuhengen | 411/414 |

FOREIGN PATENT DOCUMENTS

| DE | 7125294 | 7/1973 |
|---|---|---|
| DE | 28 53 976 | 6/1980 |
| DE | 32 35 352 | 3/1984 |

(Continued)

Primary Examiner—Katherine Mitchell
Assistant Examiner—Jeffrey A. Sharp
(74) Attorney, Agent, or Firm—Banner & Witcoff, Ltd.

(57) ABSTRACT

The invention relates to a self-tapping screw, whose threads, in a rear area (facing the head), have a substantially cylindrical external diameter and, in a front area (facing away from the head), extend with an external diameter which decreases towards the end of the screw. Both in the rear area and in the front area, the threads have an asymmetrical cross section with a bisector of the flank angle, measured at the thread tips, which is located obliquely with respect to the axial course of the core and which reverses from the rear area (first cross section) towards the front area (second cross section), the bisector in the front area being inclined towards the screw head. The reversal point of the thread cross section is placed such that the first cross section is substantially present in the rear area, the second cross section substantially in the front area.

10 Claims, 1 Drawing Sheet

Figure 1:
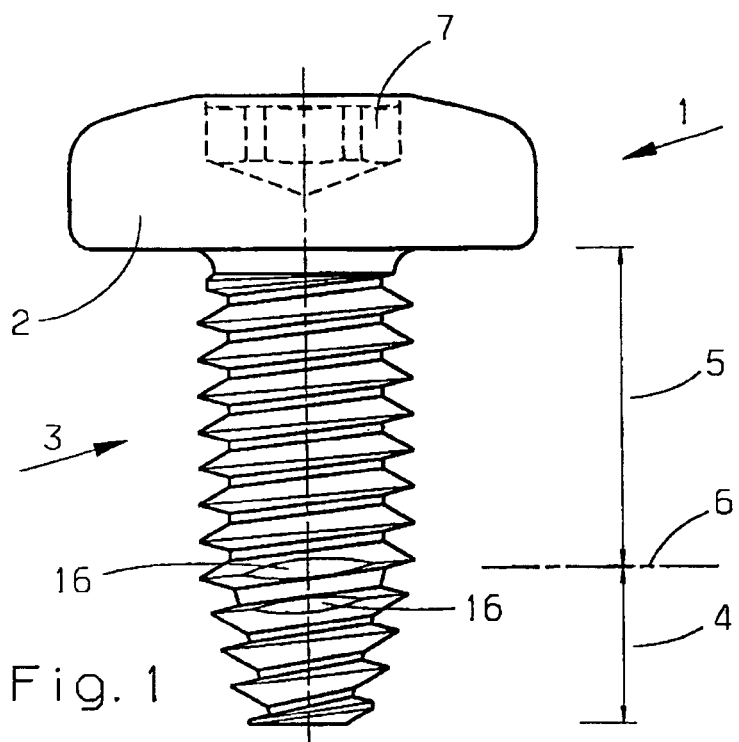

| | FOREIGN PATENT DOCUMENTS | | | EP | 504 782 | | 3/1992 |
|----|----|----|----|----|----|----|----|
| | | | | EP | 589 398 | | 9/1993 |
| DE | 19831269 | * | 2/1999 | FR | 1483931 | * | 4/1966 |
| DE | 19960287 | * | 12/1999 | FR | 1483931 | | 5/1967 |
| DE | 198 31 269 | | 11/2000 | | | | |
| DE | 199 60 287 | | 7/2001 | | | | |
| DE | 19960287 | * | 7/2001 | * cited by examiner | | | |

SELF-TAPPING SCREW

The invention relates to a self-tapping screw whose threads, in a rear area (facing the head), have a substantially cylindrical external diameter and, in a front area (facing away from the head), extend with an external diameter which decreases towards the screw end.

Self-tapping screws of this type are known in various embodiments. For example, German utility model 7 125 294 discloses what is known as a sheet-metal screw which runs out over a conical area into a threaded point, by which means screwing the sheet-metal screw into a hole in a sheet-metal plate is made easier, the thread structure extending uniformly over the screw shank and the threaded point, apart from a smaller thread pitch in the vicinity of the screw head. A similar configuration is shown by German patent specification 198 31 269, in which the external diameter of the thread is enlarged only in the rear area in the vicinity of the screw head and, in this area, the threaded cross section runs asymmetrically with respect to the radius. Apart from this special feature, extending over a short section of the thread, the thread structure is uniform over the remaining area of the screw. In addition, reference should also be made to German laid-open specification 28 53 976 which, in its rear area, continuously has a cylindrical external diameter with a symmetrical threaded cross section and, in its front area, with a smaller basic diameter and a pointed end, has a thread with a substantially smaller external diameter and a smaller thread pitch, this thread extending as far as the end of the thread running out into the point Apart from the aforementioned sheet-metal screw, the screws mentioned in the other two documents are substantially configured to be screwed into plastic.

The invention is based on the object of providing a screw which is suitable to be screwed into sheet-metal material and which has a configuration by means of which the material forced out of the sheet-metal material by the screwing action produces a support which is concentrated substantially in the screwing-in direction, that is to say on the side of the sheet-metal material which faces away from the screw head. In addition, after being tightened, the screw is intended to withstand high pull-out forces. According to the invention, this is achieved by the threads, both in the rear area and in the front area, having an asymmetrical cross section with a bisector of the flank angle, measured at the thread tips, which is located obliquely with respect to the radial direction and reverses from the rear area (first cross section) towards the front area (second cross section), the bisector in the area of the second cross section being inclined towards the screw head and the reversal point of the threaded cross section being placed such that the first cross section is present substantially in the rear area and the second cross section substantially in the front area.

Because of the inclined, that is to say oblique, bisector, the result is a corresponding skewed position of the threads which, in the front area, are inclined towards the screw head and therefore, as the screw is screwed in, exert a particularly high axially oriented pressure on the sheet-metal material with their greater-area rear flank (facing away from the screw head) and therefore, with this rear flank, displace more sheet-metal material in the screwing-in direction than with their load flank (facing the screw head). The result of this is that, as the screw is screwed in, the support produced in the process (sheet-metal bead) is pushed substantially forwards in front of its threads and, accordingly, appears substantially on the side of the sheet-metal material which faces away from the screw head. Therefore, only little displaced material, if any, which can lead to a support on this side of the sheet-metal material, remains on the other side of the sheet-metal material. Since, in the rear area of the screw, the cross section of the threads runs in the opposite direction to that in the front area, that is to say the bisector of the threads in the rear area faces away from the screw head, the threads in the rear area can be supported particularly well against the sheet-metal material with their load flank, which is flat as compared with the rear flank and therefore has a larger area, which results in particularly high pull-out forces for the tightened screw. Because of the reversal in the cross section of the threads, the result is therefore, in each case in the front and rear area, a reversed displacement effect with respect to the sheet-metal material, which firstly permits the desired shaping of the support and secondly advantageously equips the screw with high pull-out forces.

The threads are expediently configured in both areas in such a way that the bisector in both areas is inclined by about 82° to the axial course of the core. As opposed to this, in a normal symmetrical thread, the angle between the bisector and the axial course of the core is 90°.

The reversal point of the thread cross section can be placed at various points on the screw, in particular the transition from the rear area to the front area. However, it is also possible to place the reversal point in front of the transition from the rear area to the front area or behind the transition from the rear area to the front area.

The screw is expediently configured in such a way that the first cross section runs in mirror-image fashion in relation to the second cross section. In this case, as the screw is screwed into the sheet-metal material, an effect is obtained on the material to be forced away by the screw [lacuna] similar relationships both in the first cross section and in the second cross section, that is to say the action of pushing sheet-metal material forwards by the second cross section in the front area is carried out with similar forces to those opposed to pull-out forces in the sheet-metal material in the first area of the first cross section.

The configuration of the cross section of the threads can be chosen to be different, for examples it is possible to configure the screw in such away at both the load flank and the rear flank of the threads run rectilinearly. In this case, this is a configuration which is known per se from German laid-open specification 32 35 352.

Another advantageous configuration of the cross section of the threads is, in the rear area, for the load flank to run rectilinearly and for the rear flank to run from the outer diameter to the base of the thread over a bend to a larger flank angle and, in the front area, for the rear flank to run rectilinearly and for the load flank to run from the outer diameter towards the base of the thread over a bend to a larger flank angle. On the basis of this configuration, which is known per se from German patent specification 199 60 287, the result, in a particularly beneficial way, is forces which, in the front area, push the material out of the sheet metal in front of them and, accordingly, produce a support substantially only on that side of the sheet metal which faces away from the screw head, the greater flank angle running between the bend and the base of the thread advantageously acting as a supporting feature and therefore imparting an appropriately high stability to the threads.

The screw is expediently configured in such a way that the bend is located at 20% to 50% of the thread height, that is to say more in the lower third of the thread height.

An advantageous configuration of the bent thread flank results if its flank angle is about 70° in the area between thread base and bend and about 45° in the area between bend and thread tip.

The thread is expediently configured in such a way that the flank angle measured at the thread tips is the same in both areas and is around 45°.

In order to be able to counteract different stresses on the screw in the front and rear areas, the screw can be configured in such a way that the flank angle measured at the thread tips is greater in the front area than in the rear area. In this case, the result is that the sheet-metal material is pushed particularly intensively in front of the screw screwed in, and therefore virtually only a support on the side of the sheet-metal material facing away from the screw head. In this case, the thread is expediently configured in such a way that the threads run out to a point in both areas. In order in this case to make it easier to tap the thread in a nut piece in the front area, the thread course is expediently configured in such a way that the individual thread tips in the front area run with a flat over a circumferential angle of about 90°.

Figure 2A:
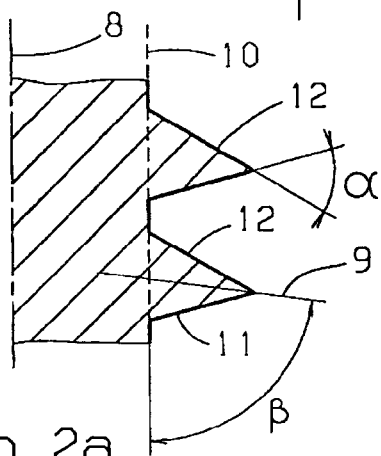
Figure 3A:
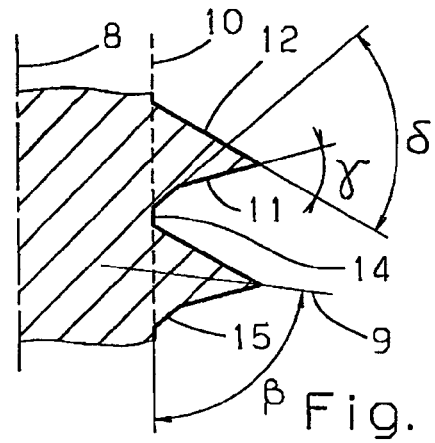

Exemplary embodiments of the invention are illustrated in the figures, in which:

FIG. 1 shows a self-tapping screw configured with the thread running asymmetrically;

FIGS. 2a and b show a schematic representation of the thread course in the rear and front areas on the basis of a thread in which the load flank and the rear flank run rectilinearly, FIGS. 3a and b show, in a schematic illustration, the thread course in which in each case a bend is placed in the rear flank and the load flank.

FIG. 1 illustrates the screw 1 provided with the thread running asymmetrically, having the screw head 2 and the threaded shank 3. The threaded shank 3 contains the front area 4 facing away from the head 2 and the rear area 5 facing the head, the two meeting at the reversal point designated by 6. In the rear area 5, the thread runs with a substantially cylindrical external diameter, while, in the front area 4, the external diameter of the thread decreases, so that there is therefore in effect a type of conical thread course.

Both in the rear area 5 and in the front area 4, the thread exhibits asymmetry with respect to its cross section, which is expressed in the fact that, in the rear area 5, the thread is inclined away from the head 2, so to speak, while it is inclined towards the head 2 in the front area 4. This thread inclination is brought out clearly in detail in the schematic illustrations according to FIGS. 2a and b and also 3a and b.

The special feature of the screw illustrated in FIG. 1 is that the cross section of the thread in the rear area 5 and in the front area 4 reverses, specifically in such a way that, in the rear area 5, the thread is inclined with its cross section away from the head 2 and, in the front area 4, appears inclined towards the head 2. This inclination will be explained in more detail further below on the basis of the respective flank angle, by using FIGS. 2a and b and also 3a and b.

The screw 1 illustrated in FIG. 1 is screwed into relatively thin metal sheet, for example steel sheet or aluminium sheet, in its preferred use. Given an external diameter of 4 mm of a screw used, this screw will expediently be screwed into metal sheets which have a thickness of about 1 mm in the case of aluminium sheet and 0.8 mm in the case of steel sheet. For this purpose, the metal sheet must have a hole into which the screw just fits with its smallest external diameter at the front end of the front area 4.

As the screw 1 is screwed in, the result is the thread being tapped into the sheet metal material on account of the action of the front area 4, which fits into the hole for the screw and, with its relatively small external diameter, begins to tap the thread. In the process, the thread of the front area 4 with the greater-area rear flank (facing away from the head) as compared with the load flank (facing the head) presses more on the material of the sheet metal and, in the process, therefore pushes a particularly great amount of sheet-metal material in front of it with the rear flank, which then leads to the desired formation of the support (sheet-metal bead) on the side of the metal sheet which faces away from the screw head 2. In the area of the reversal point 6, various threads have the flats 16 which make it easier to tap the thread in the sheet metal.

It should be pointed out that a screw driving means 7, a Torx here, is pressed into the screw head 2, by means of which the tapping torque is transmitted to the screw.

FIGS. 2a and b illustrate the thread of the screw shank 3 according to FIG. 1 in a schematic illustration in cross section, specifically on one side beside the centre line 8 which passes through the screw.

FIG. 2a concerns the rear area 5, in which the threads are illustrated as facing away from the screw head. The flank angle α of the thread in the rear area 5 is 45° here. In addition, with respect to one thread, FIG. 2a shows the bisector 9 of the angle α which, in relation to the axial course of the core according to the line 10, runs at the angle β, which is around 82° here.

Figure 2B:
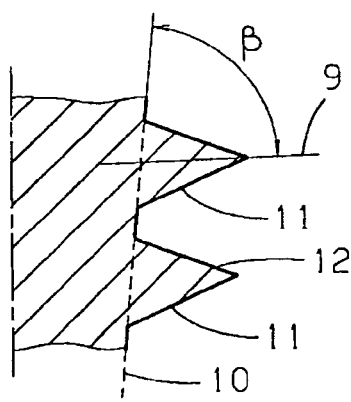

In FIG. 2b, the front area 4 of the thread of the threaded shank 3 according to FIG. 1 is illustrated which, in principle, corresponds to the cross section of the thread in the rear area 5 according to FIG. 2a but, because of the external diameter which reduces in the axial direction, is, so to speak, conical, but the angle of the bisector 9 in FIG. 2b being equal to the angle β in FIG. 2a, specifically because this angle is in any case defined with respect to the axial course of the core 10, which runs conically in the front area 4. The flank angle α in the front area 4 is equal to the angle α in the rear area. In the case of application to particularly thin sheet metal, the flank angle α can also be chosen to be larger in the front area 4, specifically with a flatter course of the rear flank. This also applies to the thread according to FIGS. 3a and b.

The particular action of the thread illustrated using FIGS. 2a and b is to be explained again below: with the rear flank 11 of the thread in the front area 4, substantially more material is displaced in the axial direction away from the screw head 2 as the screw is screwed into the metal sheet than with the load flank 12, which has a weaker action on the material of the metal sheet than the rear flank 11 because of its smaller surface. In consequence, the rear flank 11 pushes more material in front of itself out of the metal sheet than the load flank 12. However, the load flank 12 has to withstand the pull-out forces which the rear area 5 has to endure, in which the load flank 12 there is designed with a greater area than the rear flank 11. As a result, the screw is particularly resistant to pull-out forces if it is screwed with its rear area into the sheet-metal material.

Figure 3B:
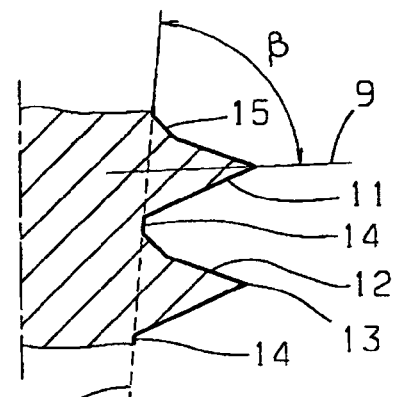

FIGS. 3a and 3b illustrate a modification of the thread cross section as compared with the thread according to FIGS. 1 and 2a and b. While, in the case of the thread according to FIGS. 2a and b, both the load flank 12 and the rear flank 11 run rectilinearly, in the case of the thread according to FIGS. 3a and 3b there is in each case a bend 15 in a flank, to be specific the flank with the bend 15 runs from the external diameter (thread tip 13) towards the core (thread base 14) in such a way that the flank angle initially runs from the thread tip 13 with a small angle and after the bend 15 with a greater angle. In FIG. 3a, the smaller (outer) flank angle is designated γ and the greater (inner) flank angle is designated δ. In the exemplary embodiment illustrated, the angle γ is 45° and the angle δ is 70°. The bisector 9 refers to the angle γ here. Here, the bend 15 is located at 30% of the thread height.

Because of the bend 15, which is followed in the direction of the core (thread base 10) by a greater flank angle, when the respectively opposite thread flank is loaded, the result is particularly beneficial support for each thread which, because of this thread course, is, so to speak, particularly secured against being bent or sheared off. This loading has to be endured by the front area 4 as the screw is screwed in since, specifically in this case, the rear flank 11 of the thread there has to tap into a metal sheet and therefore has to push the material in front of itself. In the rear area 5, in contrast, the load flank 12 is loaded on account of pull-out forces which occur and, in the process, is, so to speak, bent in the direction away from the screw head, whereas each thread can then be supported beneficially by the bent-over rear flank arranged on the other side. The thread provided with the bend 15 is therefore particularly more resistant with respect to high pull-out forces.

The invention claimed is:

1. Self-tapping screw (1) comprising a head and a core, the core having a front area, a rear area and a transition between the rear area and the front area, with threads in the rear area (5) having a substantially cylindrical external diameter and in the front area (4) extending with an external diameter which decreases from the transition toward a leading end of the screw, the threads having a load flank (12) and a rear flank (11) which define a flank angle (γ), characterized in that, the threads of the screw in the rear area (5) have a straight load flank (12) from a tip (13) of the threads to the core (14), and in the front area (4) a straight rear flank (11) from the tip (13) to the core (14), the threads forming a generally triangularly cross section with an oblique bisector (9) of the flank angle (γ) directed outwardly between the load flank (12) and the rear flank (11), the bisector reversing from the rear area (5) to the front area (4) such that the bisector is outwardly inclined away from the screw head (2) in the rear area (5) and outwardly inclined toward the screw head (2) in the front area (4); and wherein in the front area (4), the load flank (12) runs from the external diameter to the core (14) over a bend (15) to a greater flank angle (δ).

2. Screw according to claim 1, characterized in that the bisector (9) in both areas (4, 5) is inclined at about 82° to the axial course of the core (10).

3. Screw according to claim 1, characterized in that the reversal point (6) of the thread cross section is located at the transition from the rear area (5) to the front area (4).

4. Screw according to claim 1, characterized in that a cross section of a thread in the front area is a substantial mirror-image to a cross section of a thread in the rear area.

5. Screw according to claim 1, characterized in that the flank angle (α, γ) measured at the thread tips (13) is equal in both areas and is approximately 45°.

6. Screw according to claim 1, characterized in that the threads run out to a point in both areas.

7. Screw according to claim 1, characterized in that, in the area of the reversal point (6), individual thread tips run with a flat (16) over a circumferential angle of about >90°.

8. Screw according to claim 1, characterized in that, in the rear area (5), the rear flank (11) runs from the external diameter to the core (14) over a bend (15) to a greater flank angle (δ).

9. Screw according to claim 8, characterized in that the bend (15) is located at 20% to 15% of the thread height.

10. Screw according to claim 8, characterized in that the flank angle δ of the bent thread flank is approximately 70° in the region between thread base (14) and bend (15) and approximately 45° in the area between bend (15) and thread tip (13).

* * * * *